(12) United States Patent
Knight

(10) Patent No.: US 9,679,049 B2
(45) Date of Patent: Jun. 13, 2017

(54) SYSTEM AND METHOD FOR PROVIDING VISUAL SUGGESTIONS FOR DOCUMENT CLASSIFICATION VIA INJECTION

(71) Applicant: FTI CONSULTING, INC., Annapolis, MD (US)

(72) Inventor: William C. Knight, Bainbridge Island, WA (US)

(73) Assignee: FTI CONSULTING, INC., Annapolis, MD (US)

( * ) Notice: Subject to any disclaimer, the term of this patent is extended or adjusted under 35 U.S.C. 154(b) by 184 days.

(21) Appl. No.: 14/564,058

(22) Filed: Dec. 8, 2014

(65) Prior Publication Data

US 2015/0095337 A1    Apr. 2, 2015

Related U.S. Application Data

(63) Continuation of application No. 13/970,560, filed on Aug. 19, 2013, now Pat. No. 8,909,647, which is a
(Continued)

(51) Int. Cl.
*G06F 17/30* (2006.01)
*G06N 5/02* (2006.01)
(Continued)

(52) U.S. Cl.
CPC .... *G06F 17/30713* (2013.01); *G06F 17/3064* (2013.01); *G06F 17/3071* (2013.01);
(Continued)

(58) Field of Classification Search
CPC ......... G06F 17/30713; G06F 17/30705; G06F 17/3071; G06F 17/30601; G06F 17/30873;
(Continued)

(56) References Cited

U.S. PATENT DOCUMENTS 3,416,150 A    12/1968 Lindberg
3,426,210 A    2/1969 Agin
(Continued)

FOREIGN PATENT DOCUMENTS

WO    03052627    6/2003

*Primary Examiner* — Leslie Wong
(74) *Attorney, Agent, or Firm* — Patrick J. S. Inouye; Krista A. Wittman

(57) ABSTRACT

A system and method for providing visual suggestions for document classification via injection are provided. Clusters of unclassified documents and a set of reference documents, each associated with a classification code, are obtained. One or more of the unclassified documents within one such cluster are compared to the reference documents. The reference documents that are similar to the compared unclassified documents are identified for the cluster. The similar reference documents are then injected into the cluster. Each of the similar reference documents in the cluster are displayed with a visual indicator representative of the associated classification code. The unclassified documents of the cluster are also displayed. A suggestion for classification for one of the unclassified documents within each cluster is provided based on the visual indicators of the similar reference documents.

18 Claims, 9 Drawing Sheets

Related U.S. Application Data continuation of application No. 12/833,872, filed on Jul. 9, 2010, now Pat. No. 8,515,957.

(60) Provisional application No. 61/236,490, filed on Aug. 24, 2009, provisional application No. 61/229,216, filed on Jul. 29, 2009.

(51) Int. Cl.
   *G06N 7/00* (2006.01)
   *G06N 99/00* (2010.01)

(52) U.S. Cl.
   CPC .. *G06F 17/30601* (2013.01); *G06F 17/30675* (2013.01); *G06F 17/30705* (2013.01); *G06F 17/30707* (2013.01); *G06F 17/30873* (2013.01); *G06N 5/02* (2013.01); *G06N 7/005* (2013.01); *G06N 99/005* (2013.01)

(58) Field of Classification Search
   CPC . G06F 17/30707; G06N 99/0053; G06N 5/02
   See application file for complete search history.

(56) References Cited

U.S. PATENT DOCUMENTS

| | | |
|---|---|---|
| 3,668,658 A | 6/1972 | Flores et al. |
| 4,893,253 A | 1/1990 | Lodder |
| 5,056,021 A | 10/1991 | Ausborn |
| 5,121,338 A | 6/1992 | Lodder |
| 5,133,067 A | 7/1992 | Hara et al. |
| 5,278,980 A | 1/1994 | Pedersen et al. |
| 5,371,673 A | 12/1994 | Fan |
| 5,442,778 A | 8/1995 | Pedersen et al. |
| 5,477,451 A | 12/1995 | Brown et al. |
| 5,488,725 A | 1/1996 | Turtle et al. |
| 5,524,177 A | 6/1996 | Suzuoka |
| 5,528,735 A | 6/1996 | Strasnick et al. |
| 5,619,632 A | 4/1997 | Lamping et al. |
| 5,619,709 A | 4/1997 | Caid et al. |
| 5,635,929 A | 6/1997 | Rabowsky et al. |
| 5,649,193 A | 7/1997 | Sumita et al. |
| 5,675,819 A | 10/1997 | Schuetze |
| 5,696,962 A | 12/1997 | Kupiec |
| 5,737,734 A | 4/1998 | Schultz |
| 5,754,938 A | 5/1998 | Herz et al. |
| 5,794,236 A | 8/1998 | Mehrle |
| 5,799,276 A | 8/1998 | Komissarchik et al. |
| 5,819,258 A | 10/1998 | Vaithyanathan et al. |
| 5,842,203 A | 11/1998 | D'Elena et al. |
| 5,844,991 A | 12/1998 | Hochberg et al. |
| 5,857,179 A | 1/1999 | Vaithyanathan et al. |
| 5,860,136 A | 1/1999 | Fenner |
| 5,862,325 A | 1/1999 | Reed et al. |
| 5,864,846 A | 1/1999 | Voorhees et al. |
| 5,864,871 A | 1/1999 | Kitain et al. |
| 5,867,799 A | 2/1999 | Lang et al. |
| 5,870,740 A | 2/1999 | Rose et al. |
| 5,909,677 A | 6/1999 | Broder et al. |
| 5,915,024 A | 6/1999 | Kitaori et al. |
| 5,920,854 A | 7/1999 | Kirsch et al. |
| 5,924,105 A | 7/1999 | Punch et al. |
| 5,940,821 A | 8/1999 | Wical |
| 5,950,146 A | 9/1999 | Vapnik |
| 5,950,189 A | 9/1999 | Cohen et al. |
| 5,966,126 A | 10/1999 | Szabo |
| 5,987,446 A | 11/1999 | Corey et al. |
| 6,006,221 A | 12/1999 | Liddy et al. |
| 6,012,053 A | 1/2000 | Pant et al. |
| 6,026,397 A | 2/2000 | Sheppard |
| 6,038,574 A | 3/2000 | Pitkow et al. |
| 6,070,133 A | 5/2000 | Brewster et al. |
| 6,089,742 A | 7/2000 | Warmerdam et al. |
| 6,092,059 A | 7/2000 | Straforini et al. |
| 6,094,649 A | 7/2000 | Bowen et al. |
| 6,100,901 A | 8/2000 | Mohda et al. |
| 6,119,124 A | 9/2000 | Broder et al. |
| 6,122,628 A | 9/2000 | Castelli et al. |
| 6,137,499 A | 10/2000 | Tesler |
| 6,137,545 A | 10/2000 | Patel et al. |
| 6,137,911 A | 10/2000 | Zhilyaev |
| 6,148,102 A | 11/2000 | Stolin |
| 6,154,219 A | 11/2000 | Wiley et al. |
| 6,167,368 A | 12/2000 | Wacholder |
| 6,173,275 B1 | 1/2001 | Caid et al. |
| 6,202,064 B1 | 3/2001 | Julliard |
| 6,216,123 B1 | 4/2001 | Robertson et al. |
| 6,243,713 B1 | 6/2001 | Nelson et al. |
| 6,243,724 B1 | 6/2001 | Mander et al. |
| 6,260,038 B1 | 7/2001 | Martin et al. |
| 6,326,962 B1 | 12/2001 | Szabo |
| 6,338,062 B1 | 1/2002 | Liu |
| 6,345,243 B1 | 2/2002 | Clark |
| 6,349,296 B1 | 2/2002 | Broder et al. |
| 6,349,307 B1 | 2/2002 | Chen |
| 6,360,227 B1 | 3/2002 | Aggarwal et al. |
| 6,363,374 B1 | 3/2002 | Corston-Oliver et al. |
| 6,377,287 B1 | 4/2002 | Hao et al. |
| 6,381,601 B1 | 4/2002 | Fujiwara et al. |
| 6,389,433 B1 | 5/2002 | Bolonsky et al. |
| 6,389,436 B1 | 5/2002 | Chakrabarti et al. |
| 6,408,294 B1 | 6/2002 | Getchius et al. |
| 6,414,677 B1 | 7/2002 | Robertson et al. |
| 6,415,283 B1 | 7/2002 | Conklin |
| 6,418,431 B1 | 7/2002 | Mahajan et al. |
| 6,421,709 B1 | 7/2002 | McCormick et al. |
| 6,438,537 B1 | 8/2002 | Netz et al. |
| 6,438,564 B1 | 8/2002 | Morton et al. |
| 6,442,592 B1 | 8/2002 | Alumbaugh et al. |
| 6,446,061 B1 | 9/2002 | Doerre et al. |
| 6,449,612 B1 | 9/2002 | Bradley et al. |
| 6,453,327 B1 | 9/2002 | Nielsen |
| 6,460,034 B1 | 10/2002 | Wical |
| 6,470,307 B1 | 10/2002 | Turney |
| 6,480,843 B2 | 11/2002 | Li |
| 6,480,885 B1 | 11/2002 | Olivier |
| 6,484,168 B1 | 11/2002 | Pennock et al. |
| 6,484,196 B1 | 11/2002 | Maurille |
| 6,493,703 B1 | 12/2002 | Knight et al. |
| 6,496,822 B2 | 12/2002 | Rosenfelt et al. |
| 6,502,081 B1 | 12/2002 | Wiltshire, Jr. et al. |
| 6,507,847 B1 | 1/2003 | Fleischman |
| 6,510,406 B1 | 1/2003 | Marchisio |
| 6,519,580 B1 | 2/2003 | Johnson et al. |
| 6,523,026 B1 | 2/2003 | Gillis |
| 6,523,063 B1 | 2/2003 | Miller et al. |
| 6,542,635 B1 | 4/2003 | Hu et al. |
| 6,542,889 B1 | 4/2003 | Aggarwal et al. |
| 6,544,123 B1 | 4/2003 | Tanaka et al. |
| 6,549,957 B1 | 4/2003 | Hanson et al. |
| 6,560,597 B1 | 5/2003 | Dhillon et al. |
| 6,571,225 B1 | 5/2003 | Oles et al. |
| 6,584,564 B2 | 6/2003 | Olkin et al. |
| 6,594,658 B2 | 7/2003 | Woods |
| 6,598,054 B2 | 7/2003 | Schuetze et al. |
| 6,606,625 B1 | 8/2003 | Muslea et al. |
| 6,611,825 B1 | 8/2003 | Billheimer et al. |
| 6,628,304 B2 | 9/2003 | Mitchell et al. |
| 6,629,097 B1 | 9/2003 | Keith |
| 6,640,009 B2 | 10/2003 | Zlotnick |
| 6,651,057 B1 | 11/2003 | Jin et al. |
| 6,654,739 B1 | 11/2003 | Apte et al. |
| 6,658,423 B1 | 12/2003 | Pugh et al. |
| 6,675,159 B1 | 1/2004 | Lin et al. |
| 6,675,164 B2 | 1/2004 | Kamath et al. |
| 6,678,705 B1 | 1/2004 | Berchtold et al. |
| 6,684,205 B1 | 1/2004 | Modha et al. |
| 6,697,998 B1 | 2/2004 | Damerau et al. |
| 6,701,305 B1 | 3/2004 | Holt et al. |
| 6,711,585 B1 | 3/2004 | Copperman et al. |
| 6,714,929 B1 | 3/2004 | Micaelian et al. |
| 6,735,578 B2 | 5/2004 | Shetty et al. |
| 6,738,759 B1 | 5/2004 | Wheeler et al. |
| 6,747,646 B2 | 6/2004 | Gueziec et al. |

(56) References Cited

U.S. PATENT DOCUMENTS

| | | | |
|---|---|---|---|
| 6,751,628 B2 | 6/2004 | Coady | |
| 6,757,646 B2 | 6/2004 | Marchisio | |
| 6,778,995 B1 | 8/2004 | Gallivan | |
| 6,785,679 B1 | 8/2004 | Dane et al. | |
| 6,804,665 B2 | 10/2004 | Kreulen et al. | |
| 6,816,175 B1 | 11/2004 | Hamp et al. | |
| 6,819,344 B2 | 11/2004 | Robbins | |
| 6,823,333 B2 | 11/2004 | McGreevy | |
| 6,841,321 B2 | 1/2005 | Matsumoto et al. | |
| 6,847,966 B1 | 1/2005 | Sommer et al. | |
| 6,862,710 B1 | 3/2005 | Marchisio | |
| 6,879,332 B2 | 4/2005 | Decombe | |
| 6,883,001 B2 | 4/2005 | Abe | |
| 6,886,010 B2 | 4/2005 | Kostoff | |
| 6,888,584 B2 | 5/2005 | Suzuki et al. | |
| 6,915,308 B1 | 7/2005 | Evans et al. | |
| 6,922,699 B2 | 7/2005 | Schuetze et al. | |
| 6,941,325 B1 | 9/2005 | Benitez et al. | |
| 6,970,881 B1 | 11/2005 | Mohan et al. | |
| 6,976,207 B1 * | 12/2005 | Rujan | G06F 17/3071 707/999.005 |
| 6,978,419 B1 | 12/2005 | Kantrowitz | |
| 6,990,238 B1 | 1/2006 | Saffer et al. | |
| 6,993,535 B2 | 1/2006 | Bolle et al. | |
| 6,996,575 B2 | 2/2006 | Cox et al. | |
| 7,003,551 B2 | 2/2006 | Malik | |
| 7,013,435 B2 | 3/2006 | Gallo et al. | |
| 7,020,645 B2 | 3/2006 | Bisbee et al. | |
| 7,039,856 B2 | 5/2006 | Peairs et al. | |
| 7,051,017 B2 | 5/2006 | Marchisio | |
| 7,054,870 B2 | 5/2006 | Holbrook | |
| 7,080,320 B2 | 7/2006 | Ono | |
| 7,096,431 B2 | 8/2006 | Tambata et al. | |
| 7,099,819 B2 | 8/2006 | Sakai et al. | |
| 7,107,266 B1 * | 9/2006 | Breyman | G06F 17/30707 |
| 7,117,151 B2 | 10/2006 | Iwahashi et al. | |
| 7,117,246 B2 | 10/2006 | Christenson et al. | |
| 7,117,432 B1 * | 10/2006 | Shanahan | G06F 17/218 707/E17.09 |
| 7,130,807 B1 | 10/2006 | Mikurak | |
| 7,137,075 B2 | 11/2006 | Hoshito et al. | |
| 7,139,739 B2 | 11/2006 | Agrafiotis et al. | |
| 7,146,361 B2 | 12/2006 | Broder et al. | |
| 7,155,668 B2 | 12/2006 | Holland et al. | |
| 7,188,107 B2 | 3/2007 | Moon et al. | |
| 7,188,117 B2 | 3/2007 | Farahat et al. | |
| 7,194,458 B1 | 3/2007 | Micaelian et al. | |
| 7,194,483 B1 | 3/2007 | Mohan et al. | |
| 7,197,497 B2 | 3/2007 | Cossock | |
| 7,209,949 B2 | 4/2007 | Mousseau et al. | |
| 7,233,886 B2 | 6/2007 | Wegerich et al. | |
| 7,233,940 B2 | 6/2007 | Bamberger et al. | |
| 7,239,986 B2 * | 7/2007 | Golub | G06F 19/20 702/20 |
| 7,240,199 B2 | 7/2007 | Tomkow | |
| 7,246,113 B2 | 7/2007 | Cheetham et al. | |
| 7,251,637 B1 | 7/2007 | Caid et al. | |
| 7,266,365 B2 | 9/2007 | Ferguson et al. | |
| 7,266,545 B2 | 9/2007 | Bergman et al. | |
| 7,269,598 B2 | 9/2007 | Marchisio | |
| 7,271,801 B2 | 9/2007 | Toyozawa et al. | |
| 7,277,919 B1 | 10/2007 | Dohono et al. | |
| 7,325,127 B2 | 1/2008 | Olkin et al. | |
| 7,353,204 B2 | 4/2008 | Liu | |
| 7,359,894 B1 | 4/2008 | Liebman et al. | |
| 7,363,243 B2 | 4/2008 | Arnett et al. | |
| 7,366,759 B2 | 4/2008 | Trevithick et al. | |
| 7,373,612 B2 | 5/2008 | Risch et al. | |
| 7,376,635 B1 * | 5/2008 | Porcari | G06F 17/279 |
| 7,379,913 B2 | 5/2008 | Steele et al. | |
| 7,383,282 B2 | 6/2008 | Whitehead et al. | |
| 7,401,087 B2 | 7/2008 | Copperman et al. | |
| 7,412,462 B2 | 8/2008 | Margolus et al. | |
| 7,418,397 B2 | 8/2008 | Kojima et al. | |
| 7,430,688 B2 | 9/2008 | Matsuno et al. | |
| 7,430,717 B1 | 9/2008 | Spangler | |
| 7,433,893 B2 | 10/2008 | Lowry | |
| 7,440,662 B2 | 10/2008 | Antona et al. | |
| 7,444,356 B2 | 10/2008 | Calistri-Yeh et al. | |
| 7,457,948 B1 | 11/2008 | Bilicksa et al. | |
| 7,472,110 B2 | 12/2008 | Achlioptas | |
| 7,490,092 B2 | 2/2009 | Morton et al. | |
| 7,509,256 B2 | 3/2009 | Iwahashi et al. | |
| 7,516,419 B2 | 4/2009 | Petro et al. | |
| 7,523,349 B2 | 4/2009 | Barras | |
| 7,558,769 B2 | 7/2009 | Scott et al. | |
| 7,571,177 B2 | 8/2009 | Damle | |
| 7,574,409 B2 * | 8/2009 | Patinkin | G06Q 10/107 706/12 |
| 7,584,221 B2 | 9/2009 | Robertson et al. | |
| 7,639,868 B1 | 12/2009 | Regli et al. | |
| 7,640,219 B2 | 12/2009 | Perrizo | |
| 7,647,345 B2 | 1/2010 | Trepess et al. | |
| 7,668,376 B2 | 2/2010 | Lin et al. | |
| 7,698,167 B2 | 4/2010 | Batham et al. | |
| 7,716,223 B2 | 5/2010 | Haveliwala et al. | |
| 7,743,059 B2 | 6/2010 | Chan et al. | |
| 7,761,447 B2 | 7/2010 | Brill et al. | |
| 7,801,841 B2 | 9/2010 | Mishra et al. | |
| 7,885,901 B2 | 2/2011 | Hull et al. | |
| 7,899,274 B2 | 3/2011 | Baba et al. | |
| 7,971,150 B2 | 6/2011 | Raskutti et al. | |
| 7,984,014 B2 | 7/2011 | Song et al. | |
| 8,010,466 B2 | 8/2011 | Patinkin | |
| 8,010,534 B2 | 8/2011 | Roitblat et al. | |
| 8,165,974 B2 * | 4/2012 | Privault | G06N 5/043 706/12 |
| 8,275,773 B2 | 9/2012 | Donnelly et al. | |
| 8,311,344 B2 | 11/2012 | Dunlop et al. | |
| 8,326,823 B2 | 12/2012 | Grandhi et al. | |
| 8,515,946 B2 | 8/2013 | Marcucci et al. | |
| 8,515,957 B2 * | 8/2013 | Knight | G06F 17/30713 707/737 |
| 8,635,223 B2 * | 1/2014 | Knight | G06F 17/30713 707/737 |
| 8,676,605 B2 | 3/2014 | Familant | |
| 8,909,647 B2 * | 12/2014 | Knight | G06F 17/30713 707/737 |
| 2002/0032735 A1 | 3/2002 | Burnstein et al. | |
| 2002/0065912 A1 | 5/2002 | Catchpole et al. | |
| 2002/0078044 A1 | 6/2002 | Song et al. | |
| 2002/0078090 A1 | 6/2002 | Hwang et al. | |
| 2002/0122543 A1 | 9/2002 | Rowen | |
| 2002/0184193 A1 | 12/2002 | Cohen | |
| 2003/0018652 A1 | 1/2003 | Heckerman | G06F 17/30713 |
| 2003/0046311 A1 | 3/2003 | Baidya et al. | |
| 2003/0110181 A1 * | 6/2003 | Schuetze | G06F 17/30713 |
| 2003/0130991 A1 | 7/2003 | Reijerse et al. | |
| 2003/0172048 A1 | 9/2003 | Kauffman | |
| 2003/0174179 A1 | 9/2003 | Suermondt et al. | |
| 2004/0024739 A1 * | 2/2004 | Copperman | G06F 17/30616 |
| 2004/0024755 A1 | 2/2004 | Rickard | |
| 2004/0034633 A1 | 2/2004 | Rickard | |
| 2004/0205482 A1 | 10/2004 | Basu | |
| 2004/0205578 A1 | 10/2004 | Wolf et al. | |
| 2004/0215608 A1 | 10/2004 | Gourlay | |
| 2004/0243556 A1 | 12/2004 | Ferrucci et al. | |
| 2005/0022106 A1 * | 1/2005 | Kawai | G06F 17/30705 715/233 |
| 2005/0025357 A1 | 2/2005 | Landwehr et al. | |
| 2005/0097435 A1 | 5/2005 | Prakash et al. | |
| 2005/0171772 A1 | 8/2005 | Iwahashi et al. | |
| 2005/0203924 A1 | 9/2005 | Rosenberg | |
| 2005/0283473 A1 | 12/2005 | Rousso et al. | |
| 2006/0008151 A1 * | 1/2006 | Lin | G06K 9/6292 382/190 |
| 2006/0021009 A1 | 1/2006 | Lunt | |
| 2006/0053382 A1 | 3/2006 | Gardner et al. | |
| 2006/0122974 A1 | 6/2006 | Perisic | |
| 2006/0122997 A1 | 6/2006 | Lin | |
| 2007/0020642 A1 | 1/2007 | Deng et al. | |
| 2007/0043774 A1 | 2/2007 | Davis et al. | |
| 2007/0044032 A1 | 2/2007 | Mollitor et al. | |

(56) References Cited

U.S. PATENT DOCUMENTS

| | | |
|---|---|---|
| 2007/0109297 A1* | 5/2007 | Borchardt ............ G06F 3/04815 |
| | | 345/419 |
| 2007/0112758 A1 | 5/2007 | Livaditis |
| 2007/0150801 A1 | 6/2007 | Chidlovskii et al. |
| 2007/0214133 A1 | 9/2007 | Liberty et al. |
| 2007/0288445 A1 | 12/2007 | Kraftsow |
| 2008/0005081 A1 | 1/2008 | Green et al. |
| 2008/0109762 A1 | 5/2008 | Hundal et al. |
| 2008/0140643 A1 | 6/2008 | Ismalon |
| 2008/0183855 A1 | 7/2008 | Agarwal et al. |
| 2008/0189273 A1 | 8/2008 | Kraftsow |
| 2008/0215427 A1 | 9/2008 | Kawada et al. |
| 2008/0228675 A1 | 9/2008 | Duffy et al. |
| 2009/0041329 A1 | 2/2009 | Nordell et al. |
| 2009/0043797 A1 | 2/2009 | Dorie et al. |
| 2009/0049017 A1 | 2/2009 | Gross |
| 2009/0097733 A1 | 4/2009 | Hero et al. |
| 2009/0106239 A1 | 4/2009 | Getner et al. |
| 2009/0125505 A1* | 5/2009 | Bhalotia ............ G06F 17/30707 |
| 2009/0222444 A1 | 9/2009 | Chowdhury et al. |
| 2009/0228499 A1* | 9/2009 | Schmidtler .......... G06N 99/005 |
| 2009/0228811 A1 | 9/2009 | Adams et al. |
| 2009/0259622 A1 | 10/2009 | Kolz et al. |
| 2009/0265631 A1 | 10/2009 | Sigurbjornsson et al. |
| 2009/0307213 A1 | 12/2009 | Deng et al. |
| 2010/0100539 A1 | 4/2010 | Davis et al. |
| 2010/0198802 A1 | 8/2010 | Kraftsow |
| 2010/0250477 A1 | 9/2010 | Yadav |
| 2010/0262571 A1 | 10/2010 | Schmidtler et al. |
| 2010/0268661 A1* | 10/2010 | Levy .................. G06Q 30/0282 |
| | | 705/347 |
| 2010/0312725 A1 | 12/2010 | Privault et al. |
| 2012/0124034 A1 | 5/2012 | Jing et al. |

\* cited by examiner

50

SYSTEM AND METHOD FOR PROVIDING VISUAL SUGGESTIONS FOR DOCUMENT CLASSIFICATION VIA INJECTION

CROSS-REFERENCE TO RELATED APPLICATION

This patent application is a continuation of commonly-assigned U.S. Pat. No. 8,909,647, issued Dec. 19, 2016, which is a continuation of U.S. Pat. No. 8,515,957, issued Aug. 20, 2013, which claims priority under 35 U.S.C. §119(e) to U.S. Provisional Patent Application, Ser. No. 61/229,216, filed Jul. 28, 2009, and U.S. Provisional Patent Application, Ser. No. 61/236,490, filed Aug. 24, 2009, the priority dates of which are claimed and the disclosures of which are incorporated by reference.

FIELD

This application relates in general to using electronically stored information as a reference point and, in particular, to a system and method for providing visual suggestions for classification via injection.

BACKGROUND

Historically, document review during the discovery phase of litigation and for other types of legal matters, such as due diligence and regulatory compliance, have been conducted manually. During document review, individual reviewers, generally licensed attorneys, are assigned sets of documents for coding. A reviewer must carefully study each document and categorize the document by assigning a code or other marker from a set of descriptive classifications, such as "privileged," "responsive," and "non-responsive." The classifications affect the disposition of each document, including admissibility into evidence. During discovery, document review can potentially affect the outcome of the underlying legal matter, so consistent and accurate results are crucial.

Manual document review is tedious and time-consuming. Marking documents is solely at the discretion of each reviewer and inconsistent results may occur due to misunderstanding, time pressures, fatigue, or other factors. A large volume of documents reviewed, often with only limited time, can create a loss of mental focus and a loss of purpose for the resultant classification. Each new reviewer also faces a steep learning curve to become familiar with the legal matter, coding categories, and review techniques.

Currently, with the increasingly widespread movement to electronically stored information (ESI), manual document review is no longer practicable. The often exponential growth of ESI exceeds the bounds reasonable for conventional manual human review and underscores the need for computer-assisted ESI review tools.

Conventional ESI review tools have proven inadequate to providing efficient, accurate, and consistent results. For example, DiscoverReady LLC, a Delaware limited liability company, conducts semi-automated document review through multiple passes over a document set in ESI form. During the first pass, documents are grouped by category and basic codes are assigned. Subsequent passes refine and further assign codings. Multiple pass review also requires a priori project-specific knowledge engineering, which is useful for only the single project, thereby losing the benefit of any inferred knowledge or know-how for use in other review projects.

Thus, there remains a need for a system and method for increasing the efficiency of document review that bootstraps knowledge gained from other reviews while ultimately ensuring independent reviewer discretion.

SUMMARY

Document review efficiency can be increased by identifying relationships between reference ESI and uncoded ESI and providing a suggestion for classification based on the relationships. A set of clusters including uncoded ESI is obtained. The uncoded ESI for a cluster are compared to a set of reference ESI. Those reference ESI most similar to the uncoded ESI are identified and inserted into the cluster. The relationship between the inserted reference ESI and uncoded ESI for the cluster are visually depicted and provide a suggestion regarding classification of the uncoded ESI.

An embodiment provides a system and method for providing visual suggestions for document classification via injection. Clusters of unclassified documents and a set of reference documents, each associated with a classification code, are obtained. One or more of the unclassified documents within one such cluster are compared to the reference documents. The reference documents that are similar to the compared unclassified documents are identified for the cluster. The similar reference documents are then injected into the cluster. Each of the similar reference documents in the cluster are displayed with a visual indicator representative of the associated classification code. The unclassified documents of the cluster are also displayed. A suggestion for classification for one of the unclassified documents within each cluster is provided based on the visual indicators of the similar reference documents.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

The ever-increasing volume of ESI underlies the need for automating document review for improved consistency and throughput. Previously classified ESI offer knowledge gleaned from earlier work in similar legal projects, as well as a reference point for classifying uncoded ESI.

Providing Suggestions Using Reference Documents

Reference ESI is previously classified by content and can be injected into clusters of uncoded, that is unclassified, ESI to influence classification of the uncoded ESI. Specifically, relationships between an uncoded ESI and the reference ESI in terms of semantic similarity or distinction can be used as an aid in providing suggestions for classifying uncoded ESI.

Figure 1:
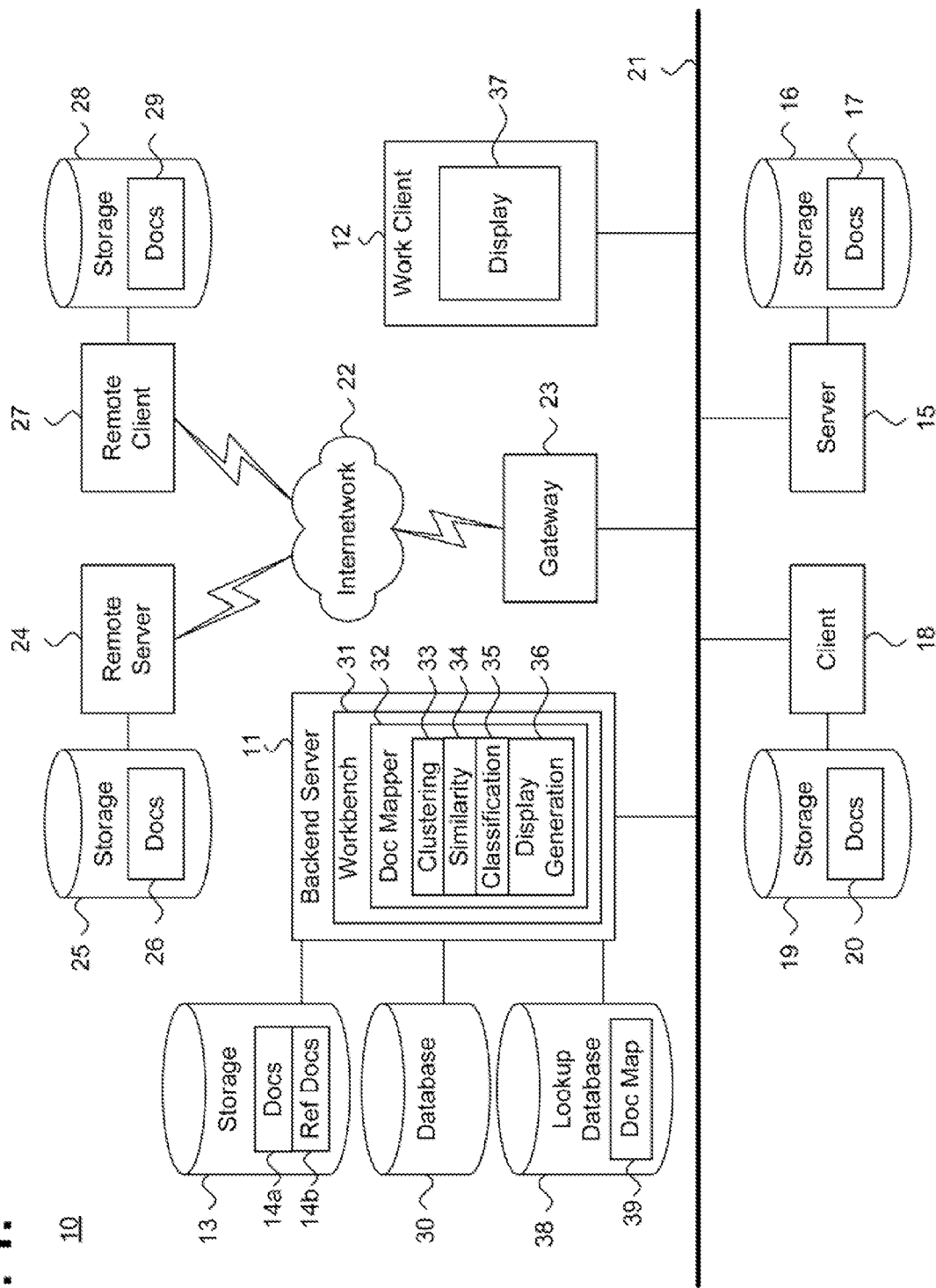
FIG. 1 is a block diagram showing a system for displaying relationships between ESI to provide classification suggestions via injection, in accordance with one embodiment.

Complete ESI review requires a support environment within which classification can be performed. FIG. 1 is a block diagram showing a system 10 for displaying relationships between ESI to provide classification suggestions via injection. By way of illustration, the system 10 operates in a distributed computing environment, which includes a plurality of heterogeneous systems and ESI sources. Henceforth, a single item of ESI will be referenced as a "document," although ESI can include other forms of non-document data, as described infra. A backend server 11 is coupled to a storage device 13, which stores documents 14a, such as uncoded documents in the form of structured or unstructured data, a database 30 for maintaining information about the documents, and a lookup database 38 for storing many-to-many mappings 39 between documents and document features, such as concepts. The storage device 13 also stores reference documents 14b, which provide a training set of trusted and known results for use in guiding ESI classification. The reference documents 14b are each associated with an assigned classification code and considered as classified or coded. Hereinafter, the terms "classified" and "coded" are used interchangeably with the same intended meaning, unless otherwise indicated. A set of reference documents can be hand-selected or automatically selected through guided review, which is further discussed below. Additionally, the set of reference documents can be predetermined or can be generated dynamically, as uncoded documents are classified and subsequently added to the set of reference documents.

The backend server 11 is coupled to an intranetwork 21 and executes a workbench software suite 31 for providing a user interface framework for automated document management, processing, analysis, and classification. In a further embodiment, the backend server 11 can be accessed via an internetwork 22. The workbench software suite 31 includes a document mapper 32 that includes a clustering engine 33, similarity searcher 34, classifier 35, and display generator 36. Other workbench suite modules are possible.

The clustering engine 33 performs efficient document scoring and clustering of uncoded documents, such as described in commonly-assigned U.S. Pat. No. 7,610,313, the disclosure of which is incorporated by reference. Clusters of uncoded documents 14 can be organized along vectors, known as spines, based on a similarity of the clusters. The similarity can be expressed in terms of distance. Document clustering is further discussed below with reference to FIG. 3. The similarity searcher 34 identifies the reference documents 14b that are most similar to selected uncoded documents 14a, clusters, or spines, which is further described below with reference to FIG. 4. The classifier 35 provides a machine-generated suggestion and confidence level for classification of the selected uncoded document 14a, cluster, or spine, as further described with reference to FIG. 7. The display generator 36 arranges the clusters and spines in thematic relationships in a two-dimensional visual display space and inserts the identified reference documents into one or more of the clusters, as further described below beginning with reference to FIG. 2. Once generated, the visual display space is transmitted to a work client 12 by the backend server 11 via the document mapper 32 for presenting to a reviewer on a display 37. The reviewer can include an individual person who is assigned to review and classify one or more uncoded documents by designating a code. Hereinafter, unless otherwise indicated, the terms "reviewer" and "custodian" are used interchangeably with the same intended meaning. Other types of reviewers are possible, including machine-implemented reviewers.

The document mapper 32 operates on uncoded documents 14a, which can be retrieved from the storage 13, as well as a plurality of local and remote sources. The local and remote sources can also store the reference documents 14b. The local sources include documents 17 maintained in a storage device 16 coupled to a local server 15 and documents 20 maintained in a storage device 19 coupled to a local client 18. The local server 15 and local client 18 are interconnected to the backend server 11 and the work client 12 over the intranetwork 21. In addition, the document mapper 32 can identify and retrieve documents from remote sources over the internetwork 22, including the Internet, through a gateway 23 interfaced to the intranetwork 21. The remote sources include documents 26 maintained in a storage device 25 coupled to a remote server 24 and documents 29 maintained in a storage device 28 coupled to a remote client 27. Other document sources, either local or remote, are possible.

The individual documents 14a, 14b, 17, 20, 26, 29 include all forms and types of structured and unstructured ESI, including electronic message stores, word processing documents, electronic mail (email) folders, Web pages, and graphical or multimedia data. Notwithstanding, the documents could be in the form of structurally organized data, such as stored in a spreadsheet or database.

In one embodiment, the individual documents 14a, 14b, 17, 20, 26, 29 can include electronic message folders storing email and attachments, such as maintained by the Outlook and Outlook Express products, licensed by Microsoft Corporation, Redmond, Wash. The database can be an SQL-based relational database, such as the Oracle database management system, release 8, licensed by Oracle Corporation, Redwood Shores, Calif.

The individual documents can be designated and stored as uncoded documents or reference documents. The reference documents are initially uncoded documents that can be selected from the corpus or other source of uncoded documents and subsequently classified. The reference documents assist in providing suggestions for classification of the remaining uncoded documents in the corpus based on visual relationships between the uncoded documents and reference documents. The reviewer can classify one or more of the remaining uncoded documents by assigning a classification code based on the relationships. In a further embodiment, the reference documents can be used as a training set to form machine-generated suggestions for classifying the remaining uncoded documents, as further described below with reference to FIG. 7.

The reference documents are representative of the document corpus for a review project in which data organization or classification is desired or a subset of the document corpus. A set of reference documents can be generated for each document review project or alternatively, the reference documents can be selected from a previously conducted document review project that is related to the current document review project. Guided review assists a reviewer in building a reference document set representative of the corpus for use in classifying uncoded documents. During guided review, uncoded documents that are dissimilar to all other uncoded documents in the corpus are identified based on a similarity threshold. Other methods for determining dissimilarity are possible. Identifying the dissimilar documents provides a group of uncoded documents that is representative of the corpus for a document review project. Each identified dissimilar document is then classified by assigning a particular classification code based on the content of the document to generate a set of reference documents for the document review project. Guided review can be performed by a reviewer, a machine, or a combination of the reviewer and machine.

Other methods for generating a reference document set for a document review project using guided review are possible, including clustering. For example, a set of uncoded document to be classified is clustered, as described in commonly-assigned U.S. Pat. No. 7,610,313, the disclosure of which is incorporated by reference. A plurality of the clustered uncoded documents are selected based on selection criteria, such as cluster centers or sample clusters. The cluster centers can be used to identify uncoded documents in a cluster that are most similar or dissimilar to the cluster center. The identified uncoded documents are then selected for classification by assigning codes. After classification, the previously uncoded documents represent a reference set. In a further example, sample clusters can be used to generate a reference set by selecting one or more sample clusters based on cluster relation criteria, such as size, content, similarity, or dissimilarity. The uncoded documents in the selected sample clusters are then assigned classification codes. The classified documents represent a reference document set for the document review project. Other methods for selecting uncoded documents for use as a reference set are possible.

The document corpus for a document review project can be divided into subsets of uncoded documents, which are each provided as an assignment to a particular reviewer. To maintain consistency, the same classification codes can be used across all assignments in the document review project. The classification codes can be determined using taxonomy generation, during which a list of classification codes can be provided by a reviewer or determined automatically. For purposes of legal discovery, the classification codes used to classify uncoded documents can include "privileged," "responsive," or "non-responsive." Other codes are possible. A "privileged" document contains information that is protected by a privilege, meaning that the document should not be disclosed to an opposing party. Disclosing a "privileged" document can result in an unintentional waiver of the subject matter. A "responsive" document contains information that is related to a legal matter on which the document review project is based and a "non-responsive" document includes information that is not related to the legal matter.

Utilizing reference documents to assist in classifying uncoded documents, clusters, or spines can be performed by the system 10, which includes individual computer systems, such as the backend server 11, work server 12, server 15, client 18, remote server 24 and remote client 27. The individual computer systems are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. The various implementations of the source code and object and byte codes can be held on a computer-readable storage medium, such as a floppy disk, hard drive, digital video disk (DVD), random access memory (RAM), read-only memory (ROM) and similar storage mediums. For example, program code, including software programs, and data are loaded into the RAM for execution and processing by the CPU and results are generated for display, output, transmittal, or storage.

Figure 2:
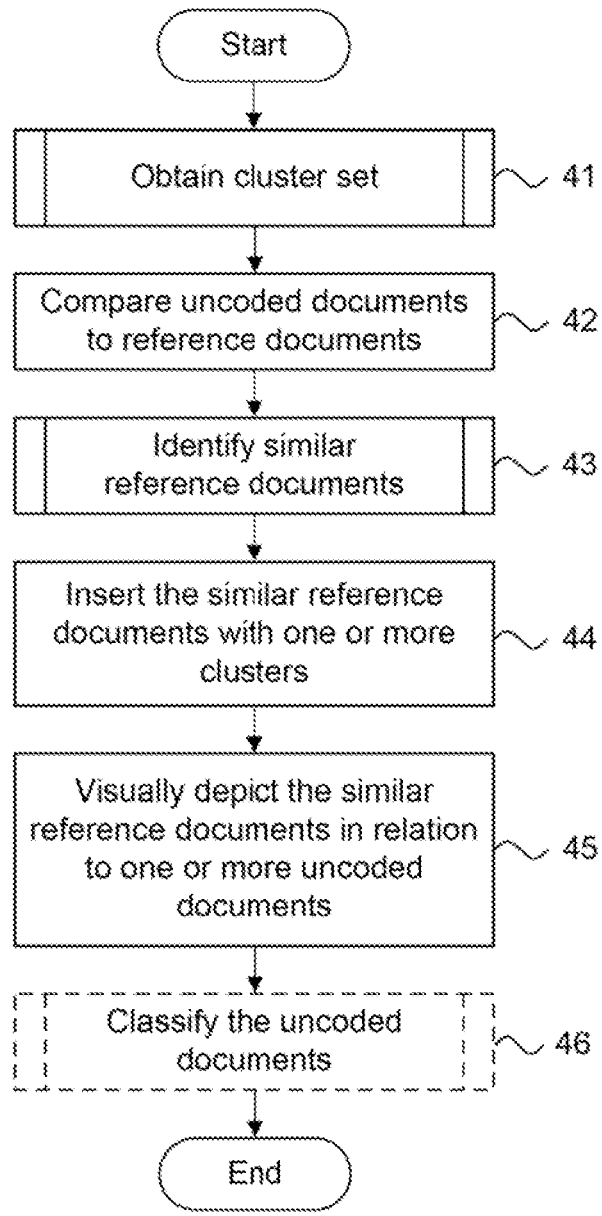
FIG. 2 is a process flow diagram showing a method for displaying relationships between ESI to provide classification suggestions via injection, in accordance with one embodiment.

Identifying the reference documents for use as classification suggestions includes a comparison of the uncoded documents and the reference documents. FIG. 2 is a process flow diagram showing a method 40 for displaying relationships between ESI to provide classification suggestions via injection. A set of clusters of uncoded documents is obtained (block 41). For each cluster, a cluster center is determined based on the uncoded documents included in that cluster. The clusters can be generated upon command or previously generated and stored. Clustering uncoded documents is further discussed below with reference to FIG. 3. One or more uncoded documents can be compared with a set of reference documents (block 42) and those reference documents that satisfy a threshold of similarity are selected (block 43). Determining similar reference documents is further discussed below with reference to FIG. 4. The selected reference documents are then injected into the cluster associated with the one or more uncoded documents (block 44). The selected reference documents injected into the cluster can be the same as or different than the selected reference documents injected into another cluster. The total number of reference documents and uncoded documents in the clusters can exceed the sum of the uncoded documents originally clustered and the reference document set. In a further embodiment, a single uncoded document or spine can be compared to the reference document set to identify similar reference documents for injecting into the cluster set.

Together, reference documents injected into the clusters represent a subset of reference documents specific to that cluster set. The clusters of uncoded documents and inserted reference documents can be displayed to visually depict relationships (block 45) between the uncoded documents in the cluster and the inserted reference documents. The relationships can provide a suggestion for use by an individual reviewer, for classifying that cluster. Determining relationships between the reference documents and uncoded documents to identify classification suggestions is further discussed below with reference to FIG. 6A-6C. Further, machine classification can optionally provide a classification suggestion based on a calculated confidence level (block 46). Machine-generated classification suggestions and confidence levels are further discussed below with reference to FIG. 7. The above process has been described with reference to documents; however, other objects or tokens are possible.

Obtaining Clusters

The corpus of uncoded documents for a review project can be divided into assignments using assignment criteria, such as custodian or source of the uncoded documents, content, document type, and date. Other criteria are possible. Each can be separately clustered or alternatively, all of the uncoded documents in the document corpus can be clustered together. The content of each uncoded document within the corpus can be converted into a set of tokens, which are word-level or character-level n-grams, raw terms, concepts, or entities. Other tokens are possible.

An n-gram is a predetermined number of items selected from a source. The items can include syllables, letters, or words, as well as other items. A raw term is a term that has not been processed or manipulated. Concepts typically include nouns and noun phrases obtained through part-of-speech tagging that have a common semantic meaning. Entities further refine nouns and noun phrases into people, places, and things, such as meetings, animals, relationships, and various other objects. Entities can be extracted using entity extraction techniques known in the field. Clustering of the uncoded documents can be based on cluster criteria, such as the similarity of tokens, including n-grams, raw terms, concepts, entities, email addresses, or other metadata.

Figure 3:
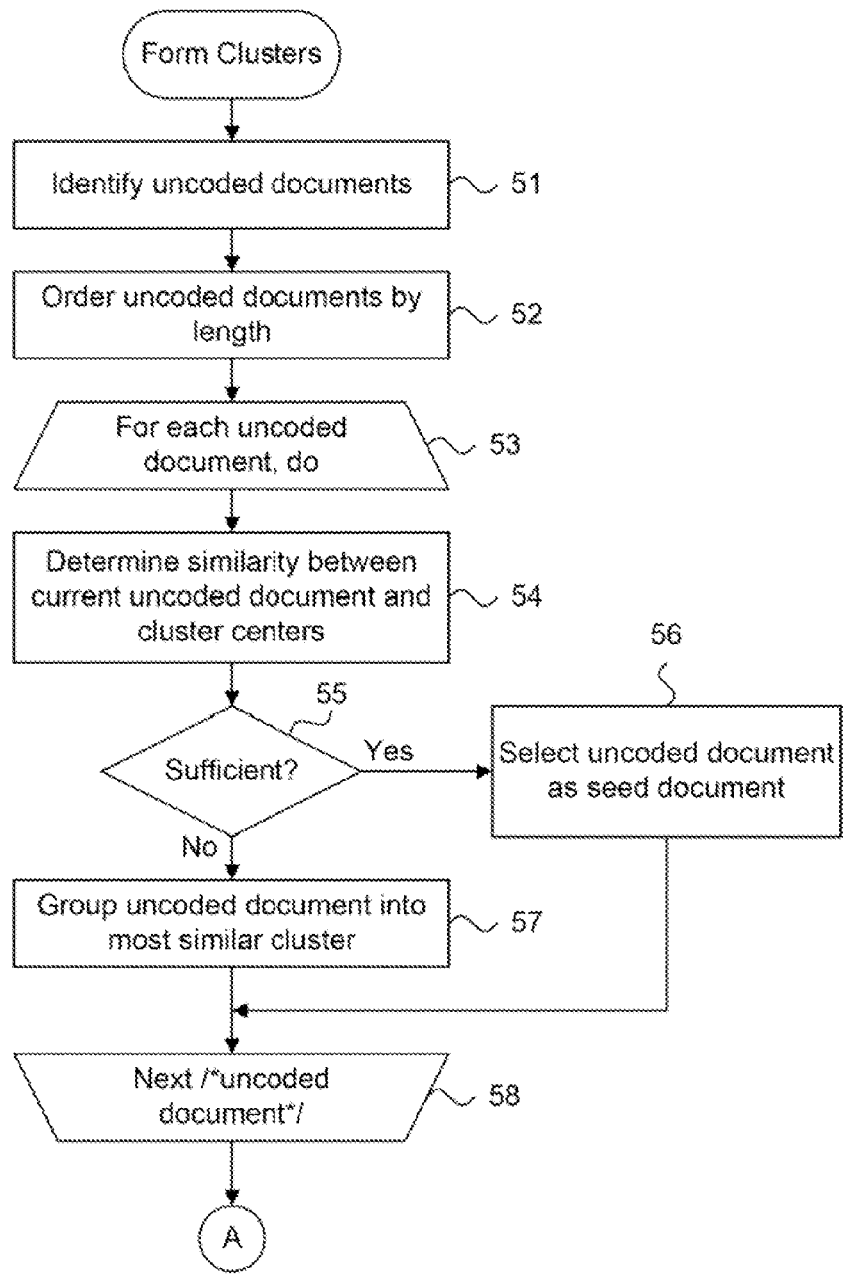
FIG. 3 is a process flow diagram showing, by way of example, a method for forming clusters for use in the method of FIG. 2.
Figure 3:
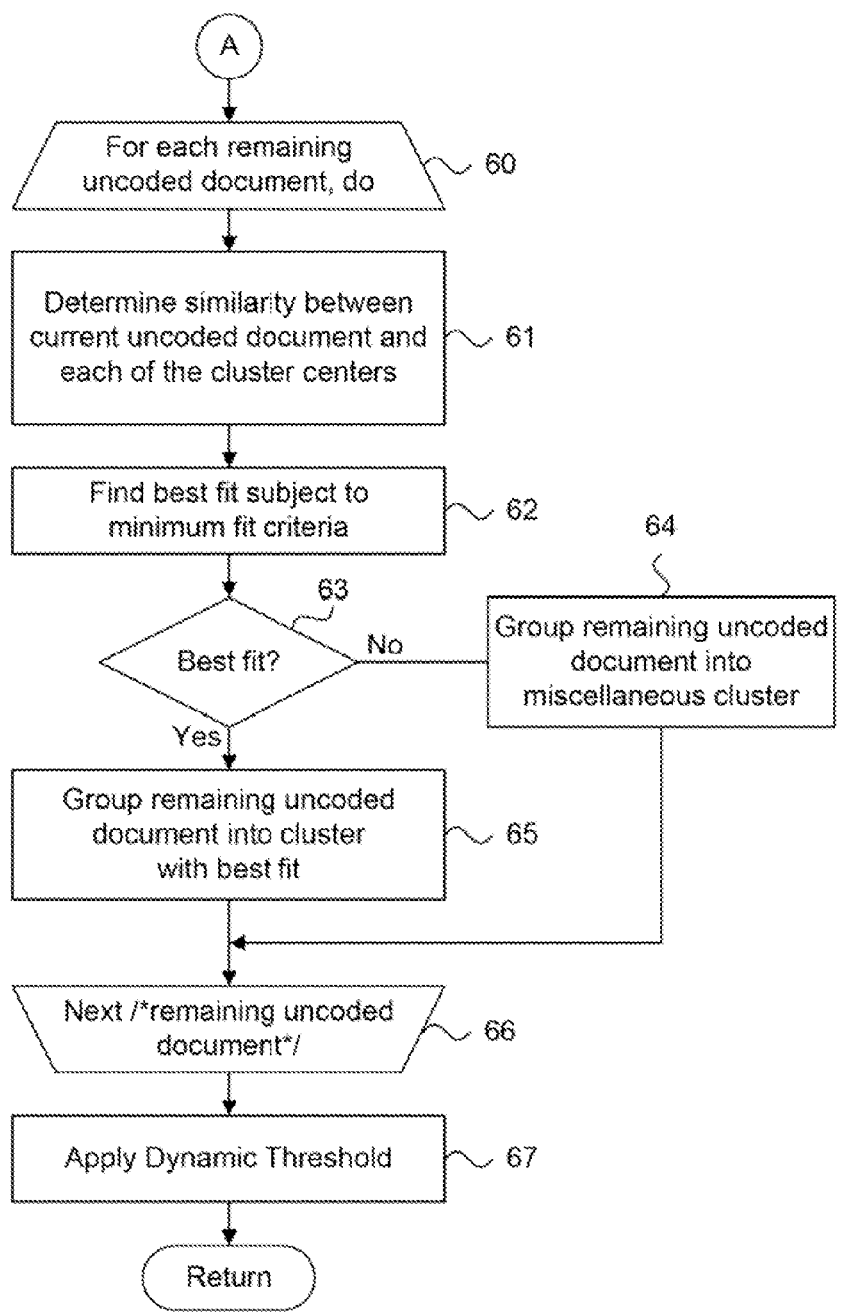

Clustering provides groupings of related uncoded documents. FIG. 3 is a flow diagram showing a routine 50 for forming clusters for use in the method 40 of FIG. 2. The purpose of this routine is to use score vectors associated with each uncoded document to form clusters based on relative similarity. The score vector for each uncoded documents includes a set of paired values for tokens identified in that document and weights. The score vector is generated by scoring the tokens extracted from each uncoded document, as described in commonly-assigned U.S. Pat. No. 7,610,313 the disclosure of which is incorporated by reference.

As an initial step for generating score vectors, each token for an uncoded document is individually scored. Next, a normalized score vector is created for the uncoded document by identifying paired values, consisting of a token occurring in that document and the scores for that token. The paired values are ordered along a vector to generate the score vector. The paired values can be ordered based on tokens, including concepts or frequency, as well as other factors. For example, assume a normalized score vector for a first uncoded document A is $\vec{S}_A = \{(5, 0.5), (120, 0.75)\}$ and a normalized score vector for another uncoded document B is $\vec{S}_B = \{(3, 0.4), (5, 0.75), (47, 0.15)\}$. Document A has scores corresponding to tokens '5' and '120' and Document B has scores corresponding to tokens '3,' '5' and '47.' Thus, these uncoded documents only have token '5' in common. Once generated, the score vectors can be compared to determine similarity or dissimilarity between the corresponding uncoded documents during clustering.

The routine for forming clusters proceeds in two phases. During the first phase (blocks 53-58), uncoded documents are evaluated to identify a set of seed documents, which can be used to form new clusters. During the second phase (blocks 60-66), the uncoded documents not previously placed are evaluated and grouped into existing clusters based on a best-fit criterion.

Initially, a single cluster is generated with one or more uncoded documents as seed documents and additional clusters of uncoded documents are added. Each cluster is represented by a cluster center that is associated with a score vector, which is representative of the tokens in all the documents for that cluster. In the following discussion relating to FIG. 3, the tokens include concepts. However, other tokens are possible, as described above. The cluster center score vector can be generated by comparing the score vectors for the individual uncoded documents in the cluster and identifying the most common concepts shared by the uncoded documents. The most common concepts and the associated weights are ordered along the cluster center score vector. Cluster centers, and thus, cluster center score vectors may continually change due to the addition and removal of documents during clustering.

During clustering, the uncoded documents are identified (block 51) and ordered by length (block 52). The uncoded documents can include all uncoded documents in a corpus or can include only those uncoded documents for a single assignment. Each uncoded document is then processed in an iterative processing loop (blocks 53-58) as follows. The similarity between each uncoded document and the cluster centers, based on uncoded documents already clustered, is determined (block 54) as the cosine (cos) σ of the score vectors for the uncoded documents and cluster being compared. The cos σ provides a measure of relative similarity or dissimilarity between tokens, including the concepts, in the uncoded documents and is equivalent to the inner products between the score vectors for the uncoded document and cluster center.

In the described embodiment, the cos σ is calculated in accordance with the equation:

$$\cos \sigma_{AB} = \frac{\langle \vec{S}_A \cdot \vec{S}_B \rangle}{|\vec{S}_A||\vec{S}_B|}$$

where $\cos \sigma_{AB}$ comprises the similarity metric between uncoded document A and cluster center B, $\vec{S}_A$ comprises a score vector for the uncoded document A, and $\vec{S}_B$ comprises a score vector for the cluster center B. Other forms of determining similarity using a distance metric are feasible, as would be recognized by one skilled in the art. An example includes using Euclidean distance.

Only those uncoded documents that are sufficiently distinct from all cluster centers (block 55) are selected as seed documents for forming new clusters (block 56). If the uncoded documents being compared are not sufficiently distinct (block 55), each uncoded document is then grouped into a cluster with the most similar cluster center (block 57). Processing continues with the next uncoded document (block 58).

In the second phase, each uncoded document not previously placed is iteratively processed in an iterative processing loop (blocks 60-66) as follows. Again, the similarity between each remaining uncoded document and each cluster center is determined based on a distance (block 61) as the cos σ of the normalized score vectors for the remaining uncoded document and the cluster center. A best fit between the remaining uncoded document and one of the cluster centers can be found subject to a minimum fit criterion (block 62). In the described embodiment, a minimum fit criterion of 0.25 is used, although other minimum fit criteria could be used. If a best fit is found (block 63), the remaining uncoded document is grouped into the cluster having the best fit (block 65). Otherwise, the remaining uncoded document is grouped into a miscellaneous cluster (block 64). Processing continues with the next remaining uncoded document (block 66). Finally, a dynamic threshold can be applied to each cluster (block 67) to evaluate and strengthen document membership in a particular cluster. The dynamic threshold is applied based on a cluster-by-cluster basis, as described in commonly-assigned U.S. Pat. No. 7,610,313, the disclosure of which is incorporated by reference. The routine then returns. Other methods and processes for forming clusters are possible.

Identifying Similar Reference Documents

Figure 4:
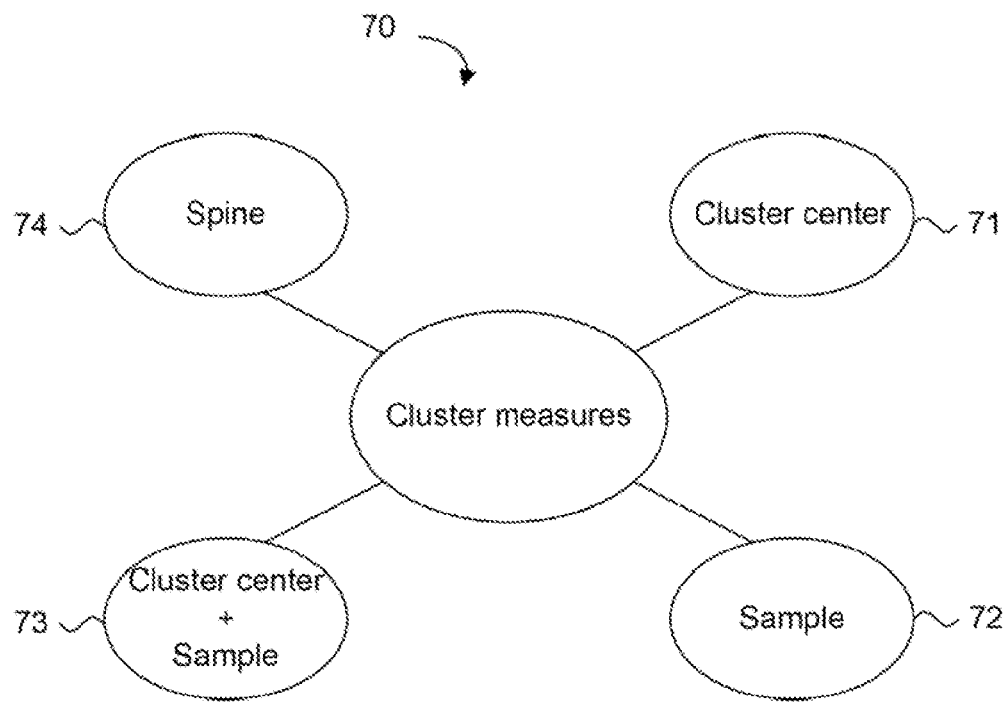
FIG. 4 is a block diagram showing, by way of example, cluster measures for comparing uncoded documents with and identifying similar reference documents for use in the method of FIG. 2.

Once a cluster set is obtained, one or more uncoded documents associated with a cluster are compared to a set of reference documents to identify a subset of the reference documents that are similar. The similarity is determined based on a similarity metric, which can include a distance metric. The similarity metric can be determined as the cos σ of the score vectors for the reference documents and clusters associated with the one or more uncoded documents. The one or more uncoded documents can be selected based on a cluster measure. FIG. 4 is a block diagram showing, by way of example, cluster measures 70 for comparing uncoded documents with and identifying similar reference documents for use in the method of FIG. 2. One or more uncoded documents in at least one cluster are compared with the reference documents to identify a subset of the reference documents that are similar. More specifically, the cluster of the one or more uncoded documents can be represented by a cluster measure, which is compared with the reference documents. The cluster measures 70 can include a cluster center 71, sample 72, cluster center and sample 73, and spine 74. Once compared, a similarity threshold is applied to the reference documents to identify those reference documents that are most similar.

Identifying similar reference documents using the cluster center measure 71 includes determining a cluster center for each cluster, comparing one or more of the cluster centers to a set of reference documents, and identifying the reference documents that satisfy a threshold similarity with the particular cluster center. More specifically, the score vector for the cluster center is compared to score vectors associated with each reference document as cos σ of the score vectors for the reference document and the cluster center. The score vector for the cluster is based on the cluster center, which considers the score vectors for all the uncoded documents in that cluster. The sample cluster measure 72 includes generating a sample of one or more uncoded documents in a single cluster that is representative of that cluster. The number of uncoded documents in the sample can be defined by the reviewer, set as a default, or determined automatically. Once generated, a score vector is calculated for the sample by comparing the score vectors for the individual uncoded documents selected for inclusion in the sample and identifying the most common concepts shared by the selected documents. The most common concepts and associated weights for the samples are positioned along a score vector, which is representative of the sample of uncoded documents for the cluster. The cluster center and sample cluster measure 73 includes comparing both the cluster center score vector and the sample score vector for a cluster to identify reference documents that are similar to the uncoded documents in that cluster.

Further, similar reference documents can be identified based on a spine, which includes those clusters that share one or more tokens, such as concepts, and are arranged linearly along a vector. The cluster spines are generated as described in commonly-assigned U.S. Pat. No. 7,271,804, the disclosure of which is incorporated by reference. Also, the cluster spines can be positioned in relation to other cluster spines, as described in commonly-assigned U.S. Pat. No. 7,610,313, issued Oct. 27, 2009, the disclosure of which is incorporated by reference. Organizing the clusters into spines and groups of cluster spines provides an individual reviewer with a display that presents the uncoded documents and reference documents according to theme while maximizing the number of relationships depicted between the documents. Each theme can include one or more concepts defining a semantic meaning.

The spine cluster measure 74 involves generating a score vector for a spine by comparing the score vectors for the clusters positioned along that spine and identifying the most common concepts shared by the clusters. The most common concepts and associated scores are positioned along a vector to form a spine score vector. The spine score vector is compared with the score vectors of the reference documents in the set to identify similar reference documents.

The measure of similarity determined between the reference documents and selected uncoded documents can be calculated as cos σ of the corresponding score vectors. However, other similarity calculations are possible. The similarity calculations can be applied to a threshold and those references documents that satisfy the threshold can be selected as the most similar. The most similar reference documents selected for a cluster can be the same or different from the most similar reference documents for the other clusters. Although four types of similarity metrics are described above, other similarity metrics are possible.

Upon identification, the similar reference documents for a cluster are injected into that cluster to provide relationships between the similar reference documents and uncoded documents. Identifying the most similar reference documents and injecting those documents can occur cluster-by-cluster or for all the clusters simultaneously. The number of similar reference documents selected for injection can be defined by the reviewer, set as a default, or determined automatically. Other determinations for the number of similar reference documents are possible. The similar reference documents can provide hints or suggestions to a reviewer regarding how to classify the uncoded documents based on the relationships.

Displaying the Reference Documents

Figure 5:
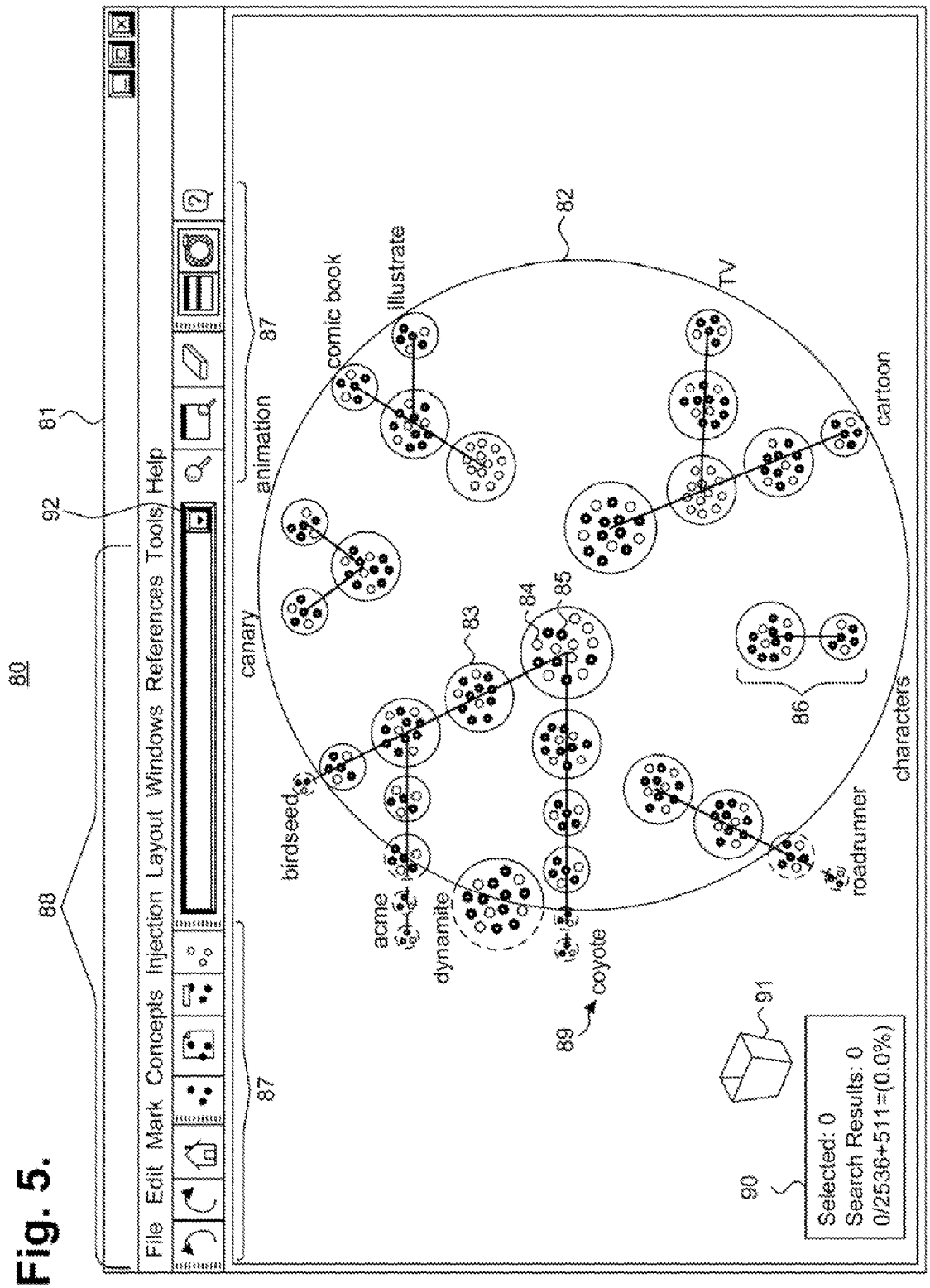
FIG. 5 is a screenshot showing, by way of example, a visual display of reference documents in relation to uncoded documents.

The clusters of uncoded documents and inserted reference documents can be provided as a display to the reviewer. FIG. 5 is a screenshot 80 showing, by way of example, a visual display 81 of reference documents 85 in relation to uncoded documents 84. Clusters 83 can be located along a spine, which is a straight vector, based on a similarity of the uncoded documents in the clusters 83. Each cluster 83 is represented by a circle; however, other shapes, such as squares, rectangles, and triangles are possible, as described in U.S. Pat. No. 6,888,548, the disclosure of which is incorporated by reference. The uncoded documents 84 are each represented by a smaller circle within the clusters 83, while the reference documents 85 are each represented by a circle with a diamond within the boundaries of the circle. The reference documents 85 can be further represented by their assigned classification code. Classification codes can include "privileged," "responsive," and "non-responsive," as well as other codes. Each group of reference documents associated with a particular classification code can be identified by a different color. For instance, "privileged" reference documents can be colored blue, while "non-responsive" reference documents are red and "responsive" reference documents are green. In a further embodiment, the reference documents for different classification codes can include different symbols. For example, "privileged" reference documents can be represented by a circle with an "X" in the center, while "non-responsive" reference documents can include a circle with striped lines and "responsive" reference documents can include a circle with dashed lines. Other classification representations for the reference documents are possible.

The display 81 can be manipulated by a individual reviewer via a compass 82, which enables the reviewer to navigate, explore, and search the clusters 83 and spines 86 appearing within the compass 82, as further described in commonly-assigned U.S. Pat. No. 7,356,777, the disclosure of which is incorporated by reference. Visually, the compass 82 emphasizes clusters 83 located within the compass 82, while deemphasizing clusters 83 appearing outside of the compass 82.

Spine labels 89 appear outside of the compass 82 at an end of each cluster spine 86 to connect the outermost cluster of the cluster spine 86 to the closest point along the periphery of the compass 82. In one embodiment, the spine labels 89 are placed without overlap and circumferentially around the compass 82. Each spine label 89 corresponds to one or more concepts that most closely describe the cluster spines 86 appearing within the compass 82. Additionally, the cluster concepts for each of the spine labels 89 can appear in a concepts list (not shown) also provided in the display. Toolbar buttons 87 located at the top of the display 81 enable a user to execute specific commands for the composition of the spine groups displayed. A set of pull down menus 88 provides further control over the placement and manipulation of clusters 83 and cluster spines 86 within the display 81. Other types of controls and functions are possible.

A document guide 90 can be placed in the display 81. The document guide 90 can include a "Selected" field, a "Search Results" field, and details regarding the numbers of uncoded documents and reference documents provided in the display. The number of uncoded documents includes all uncoded documents within a corpus of documents for a review project or within an assignment for the project. The number of reference documents includes the total number of reference documents selected for injection into the cluster set. The "Selected" field in the document guide 90 provides a number of documents within one or more clusters selected by the reviewer. The reviewer can select a cluster by "double clicking" the visual representation of that cluster using a mouse. The "Search Results" field provides a number of uncoded documents and reference documents that include a particular search term identified by the reviewer in a search query box 92.

In one embodiment, a garbage can 91 is provided to remove tokens, such as cluster concepts from consideration in the current set of clusters 83. Removed cluster concepts prevent those concepts from affecting future clustering, as may occur when a reviewer considers a concept irrelevant to the clusters 83.

Figure 6A:
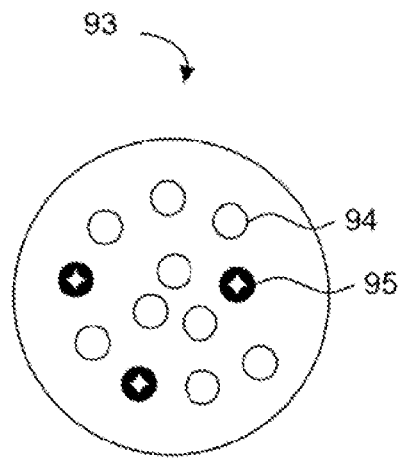
FIG. 6A is a block diagram showing, by way of example, a cluster with "privileged" reference documents and uncoded documents.

The display 81 provides a visual representation of the relationships between thematically related documents, including uncoded documents and injected reference documents. The uncoded documents and injected reference documents located within a cluster or spine can be compared based on characteristics, such as the assigned classification codes of the reference documents, a number of reference documents associated with each classification code, and a number of different classification codes, to identify relationships between the uncoded documents and injected reference documents. The reviewer can use the displayed relationships as suggestions for classifying the uncoded documents. For example, FIG. 6A is a block diagram showing, by way of example, a cluster 93 with "privileged" reference documents 95 and uncoded documents 94. The cluster 93 includes nine uncoded documents 94 and three reference 95 documents. The three reference documents 95 are each classified as "privileged." Accordingly, based on the number of "privileged" reference documents 95 present in the cluster 93, the absence of other classifications of reference documents, and the thematic relationship between the uncoded documents 94 and the "privileged" reference documents 95, the reviewer may be more inclined to review the uncoded documents 94 in that cluster 93 or to classify one or more of the uncoded documents 94 as "privileged," without review.

Figure 6B:
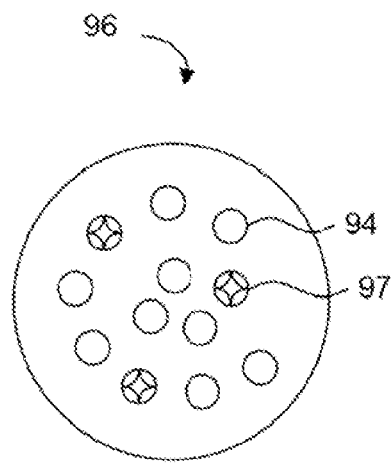
FIG. 6B is a block diagram showing, by way of example, a cluster 96 with "non-responsive" reference documents 97 and uncoded documents 94.

Alternatively, the three reference documents can be classified as "non-responsive," instead of "privileged" as in the previous example. FIG. 6B is a block diagram showing, by way of example, a cluster 96 with "non-responsive" reference documents 97 and uncoded documents 94. The cluster 96 includes nine uncoded documents 94 and three "non-responsive" documents 97. Since the uncoded documents 94 in the cluster are thematically related to the "non-responsive" reference documents 97, the reviewer may wish to assign a "non-responsive" code to one or more uncoded documents 94 without review, as they are most likely not relevant to the legal matter associated with the document review project. In making a decision to assign a code, such as "non-responsive," the reviewer can consider the number of "non-responsive" reference documents, the presence or absence of other reference document classification codes, and the thematic relationship between the "non-responsive" reference documents and the uncoded documents. Thus, the presence of three "non-responsive" reference documents 97 in the cluster of uncoded documents provides a suggestion that the uncoded documents 94 may also be "non-responsive." Further, the label 89 associated with the spine 86 upon which the cluster 96 is located can be used to influence a suggestion.

Figure 6C:
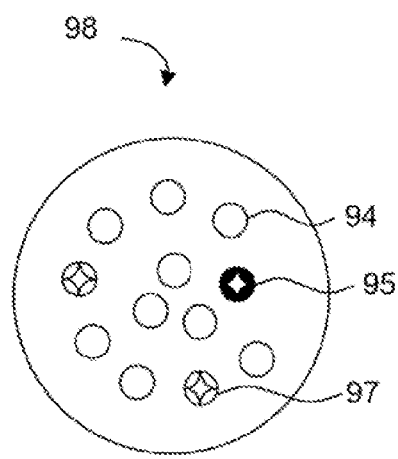
FIG. 6C is a block diagram showing, by way of example, a cluster 98 with a combination of classified reference documents and uncoded documents 94.

A further example can include a combination of "privileged" and "non-responsive" reference documents. For example, FIG. 6C is a block diagram showing, by way of example, a cluster 98 with uncoded documents 94 and a combination of reference documents 95, 97. The cluster 98 can include one "privileged" reference document 95, two "non-responsive" documents 97, and nine uncoded documents 94. The "privileged" 95 and "non-responsive" 97 reference documents can be distinguished by different colors or shapes, as well as other identifiers for the circle. The combination of "privileged" 95 and "non-responsive" 97 reference documents within the cluster 98 can suggest to a reviewer that the uncoded reference documents 94 should be reviewed before classification or that one or more uncoded reference documents 94 should be classified as "non-responsive" based on the higher number of "non-responsive" reference documents 97 in the cluster 98. In making a classification decision, the reviewer may consider the number of "privileged" reference documents 95 versus the number of "non-responsive" reference documents 97, as well as the thematic relationships between the uncoded documents 94 and the "privileged" 95 and "non-responsive" 97 reference documents. Additionally, the reviewer can identify the closest reference document to an uncoded document and assign the classification code of the closest reference document to the uncoded document. Other examples, classification codes, and combinations of classification codes are possible.

Additionally, the reference documents can also provide suggestions for classifying clusters and spines. The suggestions provided for classifying a cluster can include factors, such as a presence or absence of classified documents with different classification codes within the cluster and a quantity of the classified documents associated with each classification code in the cluster. The classified documents can include reference documents and newly classified uncoded documents. The classification code assigned to the cluster is representative of the documents in that cluster and can be the same as or different from one or more classified documents within the cluster. Further, the suggestions provided for classifying a spine include factors, such as a presence or absence of classified documents with different classification codes within the clusters located along the spine and a quantity of the classified documents for each classification code. Other suggestions for classifying documents, clusters, and spines are possible.

Classifying Uncoded Documents

The display of relationships between the uncoded documents and reference documents provides suggestions to an individual reviewer. The suggestions can indicate a need for manual review of the uncoded documents, when review may be unnecessary, and hints for classifying the uncoded documents. Additional information can be provided to assist the reviewer in making classification decisions for the uncoded documents, such as a machine-generated confidence level associated with a suggested classification code, as described in commonly-assigned U.S. Pat. No. 8,632,223, issued Jan. 21, 2014, the disclosure of which is incorporated by reference.

Figure 7:
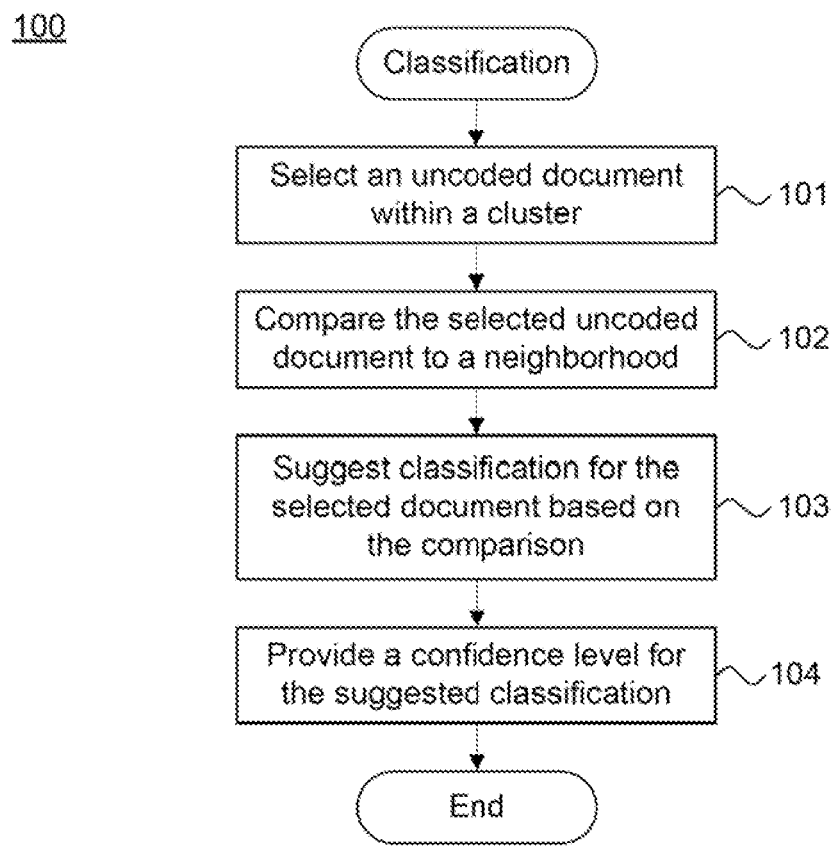
FIG. 7 is a process flow diagram showing, by way of example, a method for classifying uncoded documents for use in the method of FIG. 2 using a classifier.

The machine-generated suggestion for classification and associated confidence level can be determined by a classifier. FIG. 7 is a process flow diagram 100 showing, by way of example, a method for classifying uncoded documents using a classifier for use in the method of FIG. 2. An uncoded document is selected from a cluster within a cluster set (block 101) and compared to a neighborhood of x-reference documents (block 102), also located within the cluster, to identify those reference documents in the neighborhood that are most relevant to the selected uncoded document. In a further embodiment, a machine-generated suggestion for classification and an associated confidence level can be provided for a cluster or spine by selecting and comparing the cluster or spine to a neighborhood of x-reference documents determined for the selected cluster or spine, as further discussed below.

The neighborhood of x-reference documents is determined separately for each selected uncoded document and can include one or more injected reference documents within that cluster. During neighborhood generation, the x-number of reference documents in a neighborhood can first be determined automatically or by an individual reviewer. Next, the x-number of reference documents nearest in distance to the selected uncoded document are identified. Finally, the identified x-number of reference documents are provided as the neighborhood for the selected uncoded document. In a further embodiment, the x-number of reference documents are defined for each classification code, rather than across all classification codes. Once generated, the x-number of reference documents in the neighborhood and the selected uncoded document are analyzed by the classifier to provide a machine-generated classification suggestion (block 103). A confidence level for the suggested classification is also provided (block 104).

The analysis of the selected uncoded document and x-number of reference documents can be based on one or more routines performed by the classifier, such as a nearest neighbor (NN) classifier. The routines for determining a suggested classification code for an uncoded document include a minimum distance classification measure, also known as closest neighbor, minimum average distance classification measure, maximum count classification measure, and distance weighted maximum count classification measure. The minimum distance classification measure includes identifying a neighbor that is the closest distance to the selected uncoded document and assigning the classification code of the closest neighbor as the suggested classification code for the selected uncoded document. The closest neighbor is determined by comparing score vectors for the selected uncoded document with each of the x-number reference documents in the neighborhood as the cos σ to determine a distance metric. The distance metrics for the x-number of reference documents are compared to identify the reference document closest to the selected uncoded document as the closest neighbor.

The minimum average distance classification measure includes calculating an average distance of the reference documents in a cluster for each classification code. The classification code of the reference documents having the closest average distance to the selected uncoded document is assigned as the suggested classification code. The maximum count classification measure, also known as the voting classification measure, includes counting a number of reference documents within the cluster for each classification code and assigning a count or "vote" to the reference documents based on the assigned classification code. The classification code with the highest number of reference documents or "votes" is assigned to the selected uncoded document as the suggested classification. The distance weighted maximum count classification measure includes identifying a count of all reference documents within the cluster for each classification code and determining a distance between the selected uncoded document and each of the reference documents. Each count assigned to the reference documents is weighted based on the distance of the reference document from the selected uncoded document. The classification code with the highest count, after consideration of the weight, is assigned to the selected uncoded document as the suggested classification.

The x-NN classifier provides the machine-generate classification code with a confidence level that can be presented as an absolute value or percentage. Other confidence level measures are possible. The reviewer can use the suggested classification code and confidence level to assign a classification to the selected uncoded document. Alternatively, the x-NN classifier can automatically assign the suggested classification. In one embodiment, the x-NN classifier only assigns an uncoded document with the suggested classification code if the confidence level is above a threshold value, which can be set by the reviewer or the x-NN classifier.

As briefly described above, classification can also occur on a cluster or spine level. For instance, for cluster classification, a cluster is selected and a score vector for the center of the cluster is determined as described above with reference to FIG. 3. A neighborhood for the selected cluster is determined based on a distance metric. The x-number of reference documents that are closest to the cluster center can be selected for inclusion in the neighborhood, as described above. Each reference document in the selected cluster is associated with a score vector and the distance is determined by comparing the score vector of the cluster center with the score vector of each reference document to determine an x-number of reference documents that are closest to the cluster center. However, other methods for generating a neighborhood are possible. Once determined, one of the classification measures is applied to the neighborhood to determine a suggested classification code and confidence level for the selected cluster.

Figure 8:
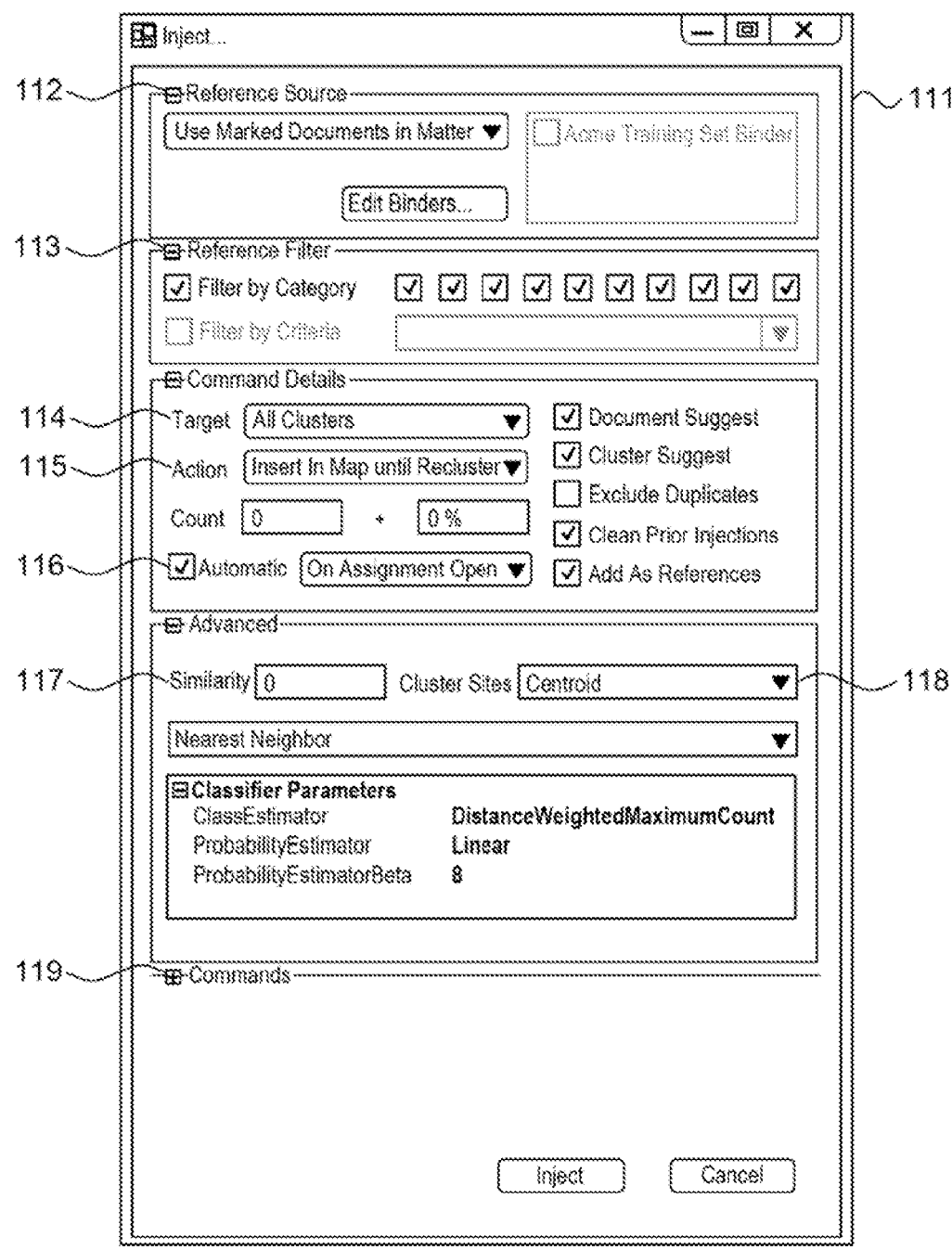
FIG. 8 is a screenshot showing, by way of example, a reference options dialogue box for entering user preferences for reference document injection.

Throughout the process of identifying similar reference documents and injecting the reference documents into a cluster to provide a classification suggestion, the reviewer can retain control over many aspects, such as a source of the reference documents and a number of similar reference documents to be selected. FIG. 8 is a screenshot 110 showing, by way of example, a reference options dialogue box 111 for entering user preferences for reference document injection. The dialogue box 111 can be accessed via a pull-down menu as described above with respect to FIG. 5. Within the dialogue box 111, the reviewer can utilize user-selectable parameters to define a source of reference documents 112, filter the reference documents by category 113, select a target for the reference documents 114, select an action to be performed upon the reference documents 115, define timing of the injection 116, define a count of similar reference documents to be injected into a cluster 117, select a location of injection within a cluster 118, and compile a list of injection commands 119. Each user-selectable option can include a text box for entry of a user preference or a drop-down menu with predetermined options for selection by a reviewer. Other user-selectable options and displays are possible.

The reference source parameter 112 allows the reviewer to identify one or more sources of the reference documents. The sources can include all previously classified reference documents in a document review project, all reference documents for which the associated classification has been verified, all reference documents that have been analyzed or all reference documents in a particular binder. The binder can include categories of reference documents, such as reference documents that are particular to the document review project or that are related to a prior document review project. The category filter parameter 113 allows the reviewer to generate and display the set of reference documents using only those reference documents associated with a particular classification code. The target parameter 114 allows the reviewer to select a target for injection of the similar reference documents. Options available for the target parameter 114 can include an assignment, all clusters, select clusters, all spines, select spines, all documents, and select documents. The assignment can be represented as a cluster set; however, other representations are possible, including a file hierarchy and a list of documents, such as an email folder, as described in commonly-assigned U.S. Pat. No. 7,404,151, the disclosure of which is incorporated by reference The action parameter 115 allows the reviewer to define display options for the injected reference documents. The display options can include injecting the similar reference documents into a map display of the clusters, displaying the similar reference documents in the map until reclustering occurs, displaying the injected reference documents in the map, and not displaying the injected reference documents in the map. Using the automatic parameter 116, the reviewer can define a time for injection of the similar reference documents. The timing options can include injecting the similar reference documents upon opening of an assignment, upon reclustering, or upon changing the selection of the target. The reviewer can specify a threshold number of similar reference documents to be injected in each cluster or spine via the similarity option 117. The number selected by a reviewer is an upper threshold since a lesser number of similar reference documents may be identified for injecting into a cluster or spine. Additionally, the reviewer can use the similarity option 117 to set a value for determining whether a reference document is sufficiently similar to the uncoded documents.

Further, the reviewer can select a location within the cluster for injection of the similar reference documents via the cluster site parameter 118. Options for cluster site injection can include the cluster centroid. Other cluster sites are possible. The user-selectable options for each preference can be compiled as a list of injection commands 119 for use in the injection process. Other user selectable parameters, options, and actions are possible.

The clustering of uncoded documents and injection of similar reference documents in the clusters has been described in relation to documents; however, in a further embodiment, the cluster and injection process can be applied to tokens. For example, uncoded tokens are clustered and similar reference tokens are injected into the clusters and displayed to provide classification suggestions based on relationships between the uncoded tokens and similar reference tokens. The uncoded documents can then be classified based on the classified tokens. In one embodiment, the tokens include concepts, n-grams, raw terms, and entities. While the invention has been particularly shown and described as referenced to the embodiments thereof, those skilled in the art will understand that the foregoing and other changes in form and detail may be made therein without departing from the spirit and scope.

What is claimed is:

1. A system for providing visual suggestions for document classification via injection, comprising:
   a database to store clusters of unclassified documents and a set of reference documents, each reference document associated with a classification code; and
   a server comprising a central processing unit, memory, an input port to receive the clusters from the database, and an output port, wherein the central processing unit is configured to:
   compare one or more of the unclassified documents within one such cluster to the reference documents;
   identify for the cluster, one or more of the reference documents that are similar to the compared unclassified documents;
   inject the similar reference documents into the cluster;
   set a threshold for a number of the similar reference documents to be injected into the cluster; and
   display each of the similar reference documents in the cluster with a visual indicator representative of the associated classification code, display the unclassified documents of the cluster, and provide a suggestion for classification for one of the unclassified documents within each cluster based on the visual indicators of the similar reference documents.

2. The system according to claim 1, further comprising:
   a reference set generator to generate the reference set, comprising:
   a corpus of uncoded documents;
   a similarity determination module to determine a similarity between each of the uncoded documents in the corpus;
   a similarity identification module to identify those uncoded documents that are dissimilar to the other uncoded documents in the corpus;
   a classification assignment module to assign the classification codes to the dissimilar uncoded documents; and a document grouping module to group the dissimilar uncoded documents with the assigned classification codes as the reference set.

3. The system according to claim 1, further comprising:
a reference set generator to generate the reference set, comprising:
   a cluster module to cluster a set of uncoded documents;
   a criteria application module to apply selection criteria to the clusters;
   a document selection module to select one or more of the clusters that satisfy the selection criteria;
   a classification assignment module to assign the classification codes to the uncoded documents in the selected clusters; and
   a document grouping module to group the uncoded documents with the assigned classification codes as the reference set.

4. The system according to claim 1, further comprising:
a reference set generator to generate the reference set, comprising:
   a clustering module to cluster a set of uncoded documents;
   a criteria application module to apply selection criteria to the uncoded documents within the clusters;
   a document selection module to select a plurality of the uncoded documents from the clusters that satisfy the selection criteria;
   a classification assignment module to assign the classification codes to the selected uncoded documents; and
   a document grouping module to group the selected uncoded documents with the assigned classification codes as the reference set.

5. The system according to claim 1, further comprising:
a reference set selection module to select the set of reference documents from a prior document review project.

6. The system according to claim 1, further comprising:
a comparison determination module to determine the one or more unclassified documents for comparison with the reference documents, comprising one of:
   a cluster center module to determine a cluster center based on a subset of the unclassified documents and to designate the subset of the unclassified documents in the cluster center as the one or more unclassified documents for comparison;
   a sample module to generate a sample of the cluster based on a subset of the unclassified documents and to designate the subset of the unclassified documents in the sample as the one or more unclassified documents for comparison; and
   a center sample module to designate the subset of unclassified documents in the cluster center and the subset of unclassified documents in the sample as the one or more unclassified documents for comparison.

7. The system according to claim 1, further comprising:
a receipt module to receive a classification code for the unclassified document and to add the unclassified document and classification code to the set of reference documents.

8. The system according to claim 1, wherein the visual indicators each comprise one of a color and a symbol.

9. The system according to claim 1, wherein the one or more reference documents injected into the cluster are at least one of the same as or different from reference documents injected into other clusters.

10. A method for providing visual suggestions for document classification via injection, comprising:
   obtaining clusters of unclassified documents;
   obtaining a set of reference documents, each reference document associated with a classification code;
   comparing one or more of the unclassified documents within one such cluster to the reference documents;
   identifying for the cluster, one or more of the reference documents that are similar to the compared unclassified documents;
   injecting the similar reference documents into the cluster;
   setting a threshold for a number of the similar reference documents to be injected into the cluster;
   displaying each of the similar reference documents in the cluster with a visual indicator representative of the associated classification code and further displaying the unclassified documents of the cluster; and
   providing a suggestion for classification for one of the unclassified documents within each cluster based on the visual indicators of the similar reference documents.

11. The method according to claim 10, further comprising:
generating the reference set, comprising:
   obtaining a corpus of uncoded documents;
   determining a similarity between each of the uncoded documents in the corpus;
   identifying those uncoded documents that are dissimilar to the other uncoded documents in the corpus;
   assigning the classification codes to the dissimilar uncoded documents; and
   grouping the dissimilar uncoded documents with the assigned classification codes as the reference set.

12. The method according to claim 10, further comprising:
generating the reference set, comprising:
   clustering a set of uncoded documents;
   applying selection criteria to the clusters;
   selecting one or more of the clusters that satisfy the selection criteria;
   assigning the classification codes to the uncoded documents in the selected clusters; and
   grouping the uncoded documents with the assigned classification codes as the reference set.

13. The method according to claim 10, further comprising:
generating the reference set, comprising:
   clustering a set of uncoded documents;
   applying selection criteria to the uncoded documents within the clusters;
   selecting a plurality of the uncoded documents from the clusters that satisfy the selection criteria;
   assigning the classification codes to the selected uncoded documents; and
   grouping the selected uncoded documents with the assigned classification codes as the reference set.

14. The method according to claim 10, further comprising:
selecting the set of reference documents from a prior document review project.

15. The method according to claim 10, further comprising:
determining the one or more unclassified documents for comparison with the reference documents, comprising one of:
   determining a cluster center based on a subset of the unclassified documents and designating the subset of the unclassified documents in the cluster center as the one or more unclassified documents for comparison;

generating a sample of the cluster based on a subset of the unclassified documents and designating the subset of the unclassified documents in the sample as the one or more unclassified documents for comparison; and designating the subset of unclassified documents in the cluster center and the subset of unclassified documents in the sample as the one or more unclassified documents for comparison.

16. The method according to claim 10, further comprising:

receiving a classification code for the unclassified document; and adding the unclassified document and classification code to the set of reference documents.

17. The method according to claim 10, wherein the visual indicators each comprise one of a color and a symbol.

18. The method according to claim 10, wherein the one or more reference documents injected into the cluster are at least one of the same as or different from reference documents injected into other clusters.

* * * * *